US012801711B2

(12) United States Patent
Machida et al.

(10) Patent No.: US 12,801,711 B2
(45) Date of Patent: Nov. 17, 2026

(54) INFORMATION PROCESSING DEVICE, INFORMATION PROCESSING METHOD, PROGRAM, AND DATA STRUCTURE

(71) Applicant: NTT TechnoCross Corporation, Tokyo (JP)

(72) Inventors: Kenichi Machida, Tokyo (JP); Kazuhira Matsui, Tokyo (JP); Asato Tanaka, Tokyo (JP)

(73) Assignee: NTT TechnoCross Corporation, Tokyo (JP)

( * ) Notice: Subject to any disclaimer, the term of this patent is extended or adjusted under 35 U.S.C. 154(b) by 128 days.

(21) Appl. No.: 18/850,503

(22) PCT Filed: Mar. 31, 2022

(86) PCT No.: PCT/JP2022/016665
§ 371 (c)(1),
(2) Date: Sep. 24, 2024

(87) PCT Pub. No.: WO2023/188313
PCT Pub. Date: Oct. 5, 2023

(65) Prior Publication Data

US 2025/0217460 A1 Jul. 3, 2025

(51) Int. Cl.
*G06F 21/32* (2013.01)
*G10L 15/22* (2006.01)
*G10L 15/26* (2006.01)

(52) U.S. Cl.
CPC .............. *G06F 21/32* (2013.01); *G10L 15/22* (2013.01); *G10L 15/26* (2013.01)

(58) Field of Classification Search
None
See application file for complete search history.

(56) References Cited

U.S. PATENT DOCUMENTS 10,111,102 B2 * 10/2018 Flaks .................... H04M 15/58
2006/0285665 A1 * 12/2006 Wasserblat ......... G06Q 20/4016 704/E17.002
2011/0145874 A1 * 6/2011 Bi .................... H04N 21/47815 725/110

(Continued)

FOREIGN PATENT DOCUMENTS

JP 2007293500 A 11/2007
JP 2019010503 A 1/2019
JP 2021158413 A 10/2021

OTHER PUBLICATIONS

"CTI Middleware; CTBASE/Core" (2024) NTT TechnoCross [online] website: https://www.ntt-tx.co.jp/products/ctbase/core.html, 8 pages.

*Primary Examiner* — Quynh H Nguyen

(57) ABSTRACT

An information processing device according to one embodiment includes: a number retainer configured to store in a storage, association information in which a user ID used in authentication of a first terminal connected via a communication network is associated with a first telephone number transmitted from the first terminal; a number identifier configured to identify a second telephone number from a speech packet of a voice call; and a user identifier configured to identify a user ID associated with the first telephone number matching the second telephone number by using the association information stored in the storage.

13 Claims, 12 Drawing Sheets

(56) References Cited

U.S. PATENT DOCUMENTS

| | | | | |
|---|---|---|---|---|
| 2020/0043464 | A1* | 2/2020 | Chae | G06N 3/0442 |
| 2023/0156024 | A1* | 5/2023 | Olson | G06Q 30/0248<br>726/23 |
| 2025/0118306 | A1* | 4/2025 | Machida | G10L 15/22 |

* cited by examiner

INFORMATION PROCESSING DEVICE, INFORMATION PROCESSING METHOD, PROGRAM, AND DATA STRUCTURE

CROSS-REFERENCE TO RELATED APPLICATIONS

This application is a U.S. 371 Application of International Patent Application No. PCT/JP2022/016665, filed on 31 Mar. 2022, the disclosure of which is hereby incorporated herein by reference in its entirety.

TECHNICAL FIELD

The present disclosure relates to an information processing device, information processing method, program, and data structure.

BACKGROUND ART

In recent years, computer telephony integration (CTI) has been increasingly introduced in contact centers (also known as call centers) for the purpose of supporting operations of operators, enhancing operational efficiency, enhancing customer satisfaction, and the like. The CTI is a mechanism for integrating and linking computers such as a speech recognition system and a customer management system with telephones and private branch exchanges (PBXs) (as disclosed in Non-patent Document 1). By introducing the CTI, for example, the speech recognition system and the PBX can be linked together to perform speech recognition for calls at the contact center. Hereinafter, introducing the CTI and linking the computer with telephones or PBXs is also referred to as "CTI linkage".

Incidentally, in recent years, an increasing number of contact centers have adopted a free address system for operator seating. The free address system is a system in which an operator does not have a fixed seat and can select a seat freely or according to some kind of rules. In the free address system, an operator's seat can change daily, but by performing speech recognition utilizing the CTI linkage, it is possible to link a speech recognized call with an operator.

RELATED ART DOCUMENTS

Patent Documents

Non-patent Document 1: "CTI Middleware "CTBASE/Core"|NTT TechnoCross", Internet <URL: https://www.ntt-tx.co.jp/products/ctbase/core.html>

SUMMARY OF THE INVENTION

Problems to be Solved by the Invention

While it is desired to perform speech recognition of calls by introducing the speech recognition system into a contact center, there are cases where the CTI cannot be introduced due to various circumstances. For example, there are cases in which an existing PBX does not support a CTI linkage function, or, although the CTI linkage is difficult due to insufficient capacity, cost for replacing the PBX is unacceptable.

In such cases, especially in contact centers adopting the free address system, there is an issue that a speech recognized call and an operator cannot be associated. Therefore, it is not possible to associate which speech recognition result relates to which operator's call.

In view of the above, the present disclosure provides a technique for associating a call with an operator.

Means for Solving the Problems

An information processing device according to one aspect of the present disclosure includes: a number retainer configured to store in a storage, association information in which a user ID used in authentication of a first terminal connected via a communication network is associated with a first telephone number transmitted from the first terminal; a number identifier configured to identify a second telephone number from a speech packet of a voice call; and a user identifier configured to identify a user ID associated with the first telephone number matching with the second telephone number by using the association information held in the storage.

Advantageous Effects of the Invention

According to the present disclosure, a technique for associating a call with an operator is provided.

DETAILED DESCRIPTION OF THE INVENTION

Hereinafter, a first embodiment and a second embodiment will be described as embodiments of the present invention.

Hereinafter, a description will be given of a contact center system 1, in which a call (voice call) with a customer can be associated with an operator who is responding to the call, when speech recognition of the call without CTI linkage is performed. However, the contact center is an example, and the same can be applied to, for example, a case in which a call is associated with a person working in an office or the like and responding to the call, in addition to the contact center. More generally, the same can be applied to a case in which a call is associated with a person responding to the call.

First Embodiment

First, the first embodiment will be described.

<Overall Configuration of Contact Center System 1>

Figure 1:
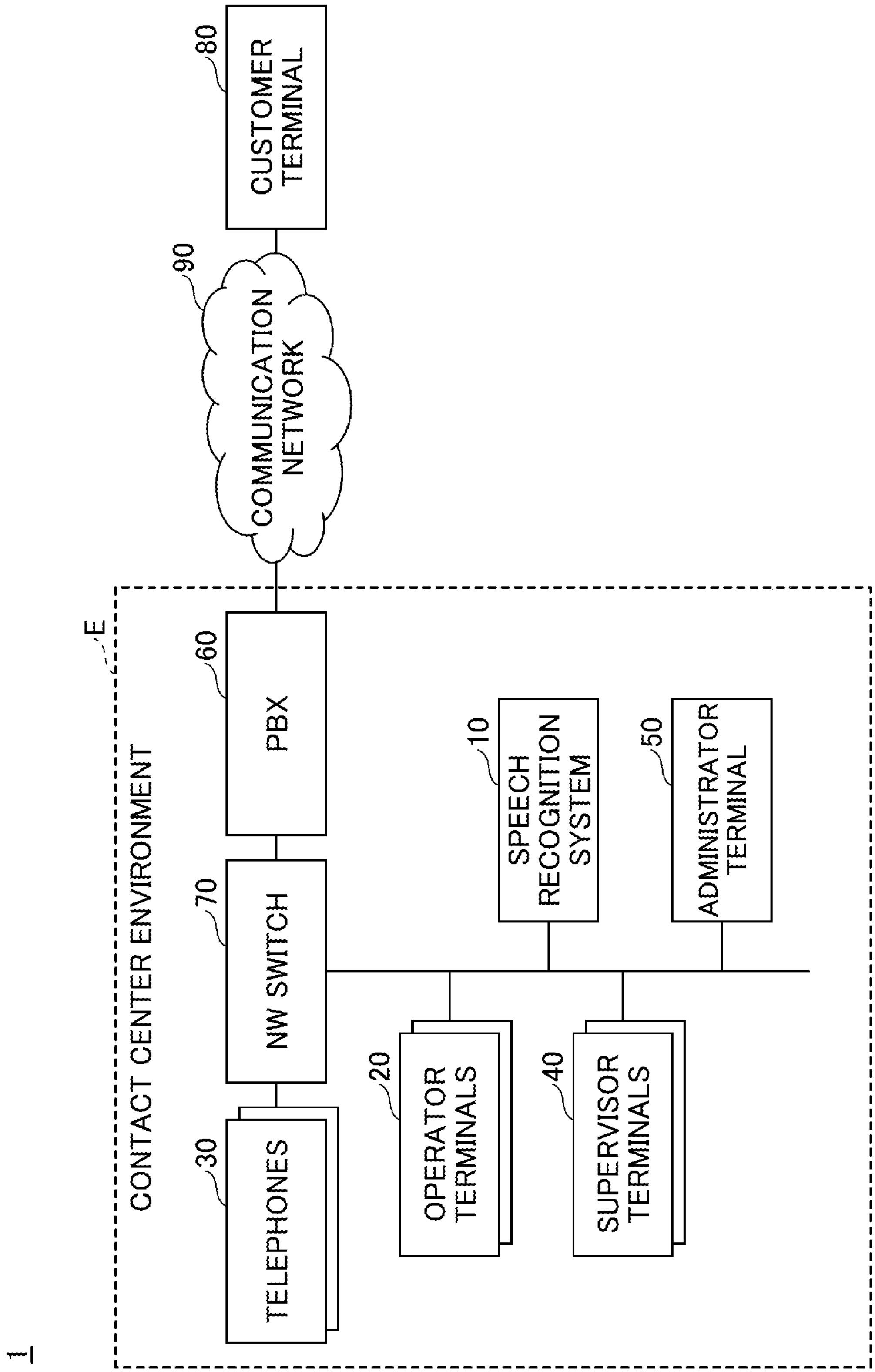
FIG. 1 is a diagram illustrating an example of an overall configuration of a contact center system according to a first embodiment.

FIG. 1 illustrates an example of an overall configuration of a contact center system 1 according to the present embodiment. As illustrated in FIG. 1, the contact center system 1 according to the present embodiment includes a speech recognition system 10, a plurality of operator terminals 20, a plurality of telephones 30, one or more supervisor terminals 40, one or more administrator terminals 50, a PBX 60, a NW switch 70, and a customer terminal 80. Here, the speech recognition system 10, the operator terminals 20, the telephones 30, the supervisor terminals 40, the administrator terminal 50, the PBX 60, and a NW switch 70 are installed in a contact center environment E, which is a system environment of a contact center. Note that the contact center environment E is not limited to the system environment in the same building, but may be, for example, a system environment in a plurality of geographically separated buildings.

The speech recognition system 10 uses a packet (speech packet) transmitted from the NW switch 70 to convert a call between a customer and an operator into a text by speech recognition, and identifies an operator responding to the call.

The operator terminal 20 is a terminal such as a personal computer (PC) used by the operator. The telephone 30 is an Internet protocol (IP) telephone (such as a fixed IP telephone or a portable IP telephone) used by the operator. In the following, it is assumed that a free address system is adopted in the contact center, and that the operator's seat may change daily (or at some timing, for example, between morning and afternoon, a change of duty, etc.). Further, in a general contact center, one operator terminal 20 and one telephone 30 are often installed at each operator's seat. Therefore, it is also assumed in the present embodiment that the free address system is adopted, that the operator's seat may change daily, and that one operator terminal 20 and one telephone 30 are installed at each seat.

The supervisor terminal 40 is a terminal such as a PC used by a supervisor. The supervisor is, for example, a person who monitors the telephone calls of an operator and supports a telephone answering service of the operator when a problem is likely to occur or in response to a request from the operator. In general, telephone calls of several to about ten operators are monitored by one supervisor.

The administrator terminal 50 is a terminal such as a PC used by a system administrator of the contact center environment E. Although only one administrator terminal 50 is illustrated in the example in FIG. 1, a plurality of administrator terminals 50 may exist.

The PBX 60 is a telephone exchange (IP-PBX) connected to a communication network 90 including a voice over Internet protocol (VoIP) network and a public switched telephone network (PSTN).

The NW switch 70 relays packets between the telephone 30 and the PBX 60, captures the packets, and transmits them to the speech recognition system 10.

The customer terminal 80 is any kind of terminals used by a customer, such as a smartphone, a cellular phone, or a fixed telephone.

The overall configuration of the contact center system 1 as illustrated in FIG. 1 is only an example, and other configurations may be used. For example, in the example as illustrated in FIG. 1, the speech recognition system 10 is included in the contact center environment E (in other words, the speech recognition system 10 is of an on-premise type), but all or a part of the functions of the speech recognition system 10 may be implemented by a cloud service or the like. Similarly, in the example as illustrated in FIG. 1, the PBX 60 is an on-premise type telephone exchange, but may be implemented by a cloud service or the like.

<Association of Call With Operator and Transmission of Speech Recognition Result by Using the Association>

Figure 2:
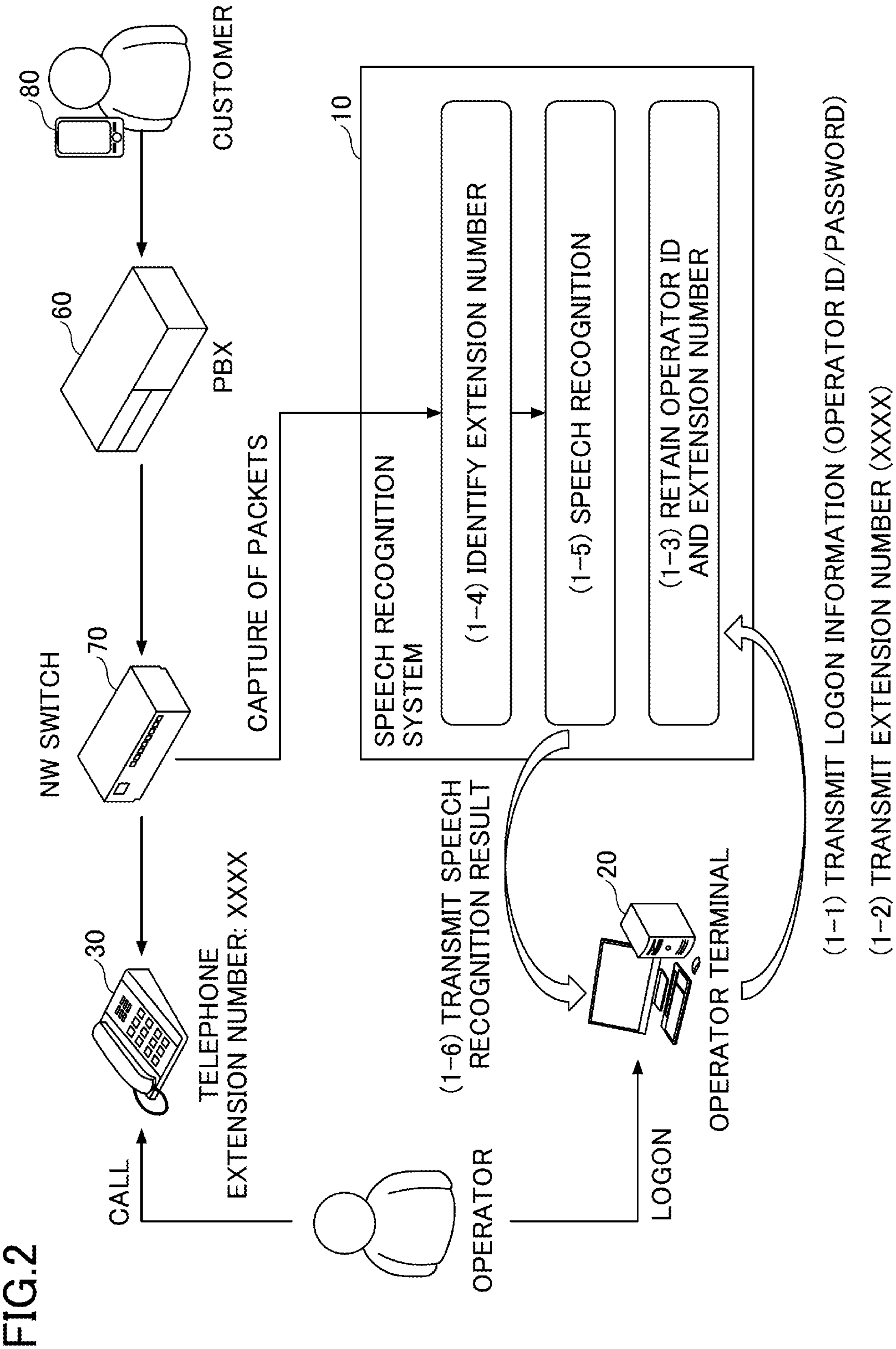
FIG. 2 is a diagram for explaining a method for associating a call with an operator according to the first embodiment and an example of transmitting a speech recognition result using the method.

Referring to FIG. 2, a case in which the call and the operator are associated in the contact center system 1 according to the present embodiment, and a speech recognition result is transmitted to the operator terminal 20 used by the operator by using the association, will be described. Here, it is assumed that each operator selects his or her own seat when starting the telephone answering service, and logs on to the operator terminal 20 of the seat by using his or her own operator ID and a password corresponding to the operator ID. The operator ID is identification information that uniquely identifies the operator. In place of the operator ID, other identification information such as a logon ID and a password corresponding to the logon may be used for the logon.

The operator typically selects the seat and logs on at the time of going to work, but this is not the only case. For example, when using different seats in the morning and in the afternoon, the operator may select a seat and log on at the start of work in the morning and at the start of work in the afternoon. In addition, when using different seats in response to a change in an assigned job, the operator may select a seat and log on at the start of an assigned job before the change and at the start of an assigned job after the change. In addition, the operator may select a seat and log on at any other timing.

Note that the operator logs out from the operator terminal 20 at the end of the work, such as at the time of leaving work, or at the time of a change in the work in charge. Since the logout is the same as that in the related art, the description thereof is omitted in the present embodiment.

At this time, the contact center system 1 according to the present embodiment associates a call with an operator by (1-1) to (1-6) in the following, and displays a speech recognition result of the call on the operator terminal 20 used by the operator.

(1-1) First, the operator terminal 20 transmits to the speech recognition system 10 logon information (the operator ID and the corresponding password) input by a logon operation by the operator. The operator ID and the corresponding password (a correct password) may be held by the speech recognition system 10, but it is not limited thereto, and may be held by a system or a device other than the speech recognition system 10, such as an authentication system.

(1-2) Next, the operator terminal 20 transmits an extension number (for example, "XXXX") to the speech recognition system 10 in response to an operation to input the extension number by the operator. Here, the operator inputs the extension number of the telephone 30 (that is, the telephone 30 installed at the same seat as the operator terminal 20 logged on in (1-1) above) installed at his or her seat. Note that the extension number of the telephone 30 may be displayed on a display of the telephone 30, or may be posted on the seat where the telephone 30 is installed, for example.

(1-3) The speech recognition system 10 retains the operator ID included in the logon information transmitted from the operator terminal 20 and the extension number transmitted from the operator terminal 20, in association with each other. Thus, the operator ID can be identified from the extension number.

(1-4) When the telephone 30 receives a call from the customer terminal 80, the speech recognition system 10 captures a packet of the call between the customer terminal 80 and the telephone 30, and specifies the extension number of the telephone 30 from the packet. Accordingly, the operator ID can be identified from the extension number, and thus the call is associated with the operator.

(1-5) The speech recognition system 10 performs speech recognition on speech data included in the packet of a call between the customer terminal 80 and the telephone 30, and converts speech represented by the speech data into a text (hereinafter, also referred to as "speech recognized text").

(1-6) Then, the speech recognition system 10 transmits the speech recognized text, which is a speech recognition result, to the operator terminal 20 used by the operator associated with the call. The speech recognized text can be displayed on the operator terminal 20 in real time. In this case, for example, the speech recognition system 10 may retain operator terminal information, such as identification information and an IP address of the operator terminal 20 used for the operator's logon, in association with the operator ID, and use the operator terminal information to identify an operator terminal 20 to which the speech recognized text is to be transmitted. Although not specifically mentioned in the following, the speech recognition system 10 transmits the speech recognized text after, as described above, specifying the operator terminal 20 to which the speech recognized text is to be transmitted, and the operator terminal 20 generates a window for displaying the speech recognized text. However, the present disclosure is not limited thereto, and for example, the operator terminal 20 may transmit a request including the operator ID and the like to the speech recognition system 10, and the speech recognized text (or information in a window in which the speech recognized text is displayed, or the like) may be returned from the speech recognition system 10 to the operator terminal 20 in response to the request.

<Functional Configuration of Contact Center System 1>

Figure 3:
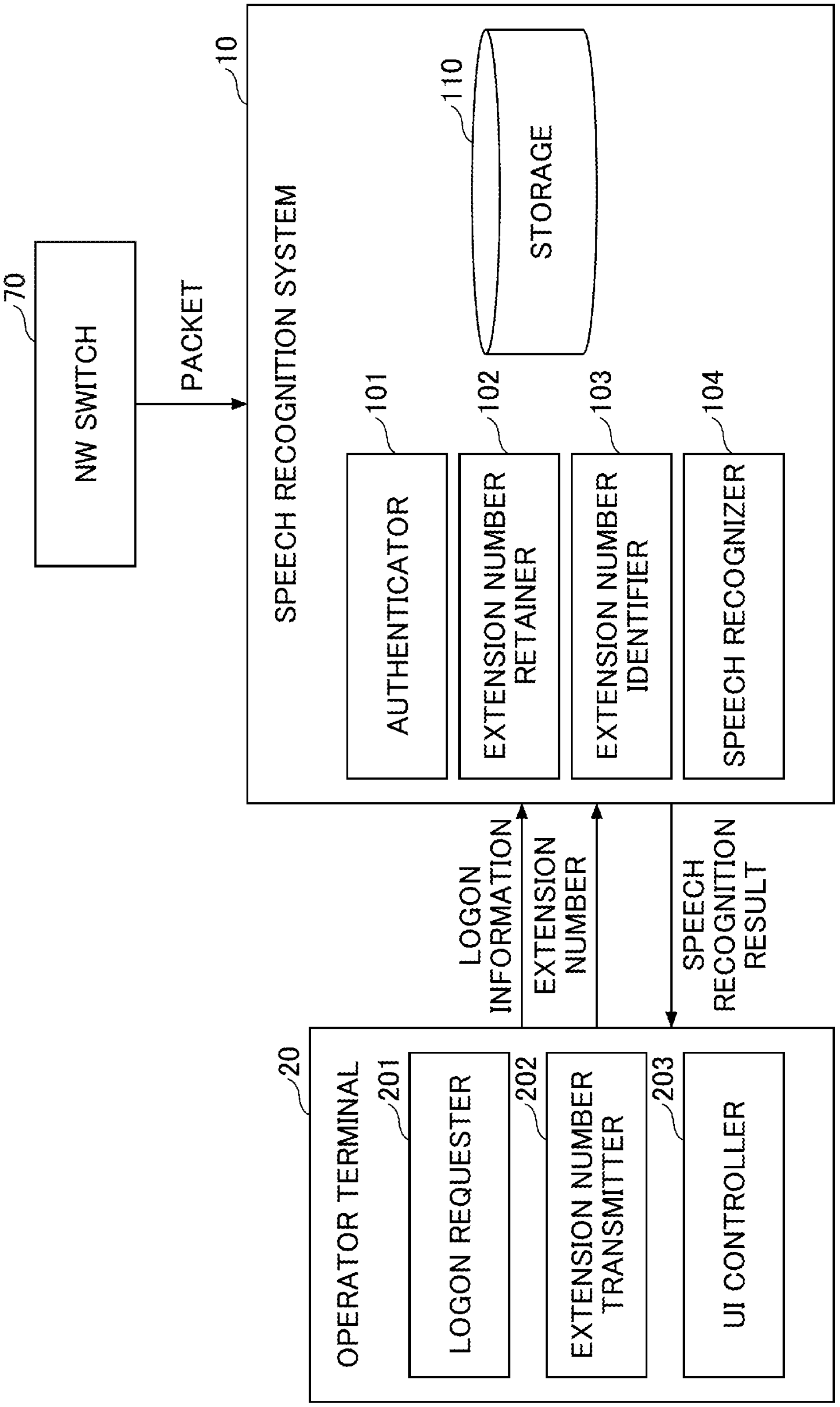
FIG. 3 is a diagram illustrating an example of a functional configuration of a contact center according to the first embodiment.

FIG. 3 is a diagram illustrating the functional configuration of the speech recognition system 10 and the operator terminal 20 included in the contact center system 1 according to the present embodiment.

<<Speech Recognition System 10>>

As illustrated in FIG. 3, the speech recognition system 10 according to the present embodiment includes an authenticator 101, an extension number retainer 102, an extension number identifier 103, and a speech recognizer 104. Each of these units is implemented by processing, for example, in which one or more programs installed in the speech recognition system 10 are executed by a processor such as a central processing unit (CPU). The speech recognition system 10 according to the present embodiment also includes a storage 110. The storage 110 can be implemented by, for example, a storage device such as a hard disk drive (HDD), a solid state drive (SSD), or a flash memory. However, the storage 110 may be implemented by, for example, a storage device connected to the speech recognition system 10 via the communication network.

The authenticator 101 authenticates the operator terminal 20 using the logon information (operator ID and corresponding password) received from the operator terminal 20.

The extension number retainer 102 stores in the storage 110 the extension number transmitted from the operator terminal 20 which has succeeded in authentication and the operator ID included in the logon information used for authenticating the operator terminal 20, in association with each other.

The extension number identifier 103 identifies an extension number of the telephone 30 which is communicating with the customer terminal 80 from a packet transmitted from the NW switch 70.

A speech recognizer 104 performs speech recognition on speech data included in the packet transmitted from the NW switch 70 and converts the speech represented by the speech data into a speech recognized text. The speech recognizer 104 refers to a correspondence between the extension number and the operator ID stored in the storage 110, identifies an operator ID corresponding to the extension number identified by the extension number identifier 103, and transmits the speech recognized text to the operator terminal 20 logged on by the operator ID.

The storage 110 stores information representing the correspondence between the extension number and the operator ID. In addition to this, various types of information (for example, information necessary for authentication of the operator terminal 20, etc.) may be stored in the storage 110.

<<Operator Terminal 20>>

As illustrated in FIG. 3, the operator terminal 20 according to the present embodiment includes a logon requester 201, an extension number transmitter 202, and a UI controller 203. Each of these components is implemented, for example, by processing in which one or more programs installed in the operator terminal 20 are executed by a processor such as the CPU.

The logon requester 201 transmits the logon information (operator ID and password corresponding thereto) input by the logon operation, to the speech recognition system 10 in accordance with the operation by the operator.

The extension number transmitter 202 transmits the extension number to the speech recognition system 10 in accordance with the operation to input the extension number by the operator.

The UI controller 203 displays various types of windows (for example, a logon window, an extension number input window, an operator window, etc., described in the following) on the display of the operator terminal 20. The UI controller 203 receives various input operations in these windows from the operator.

<Processing at Logon>

Figure 4:
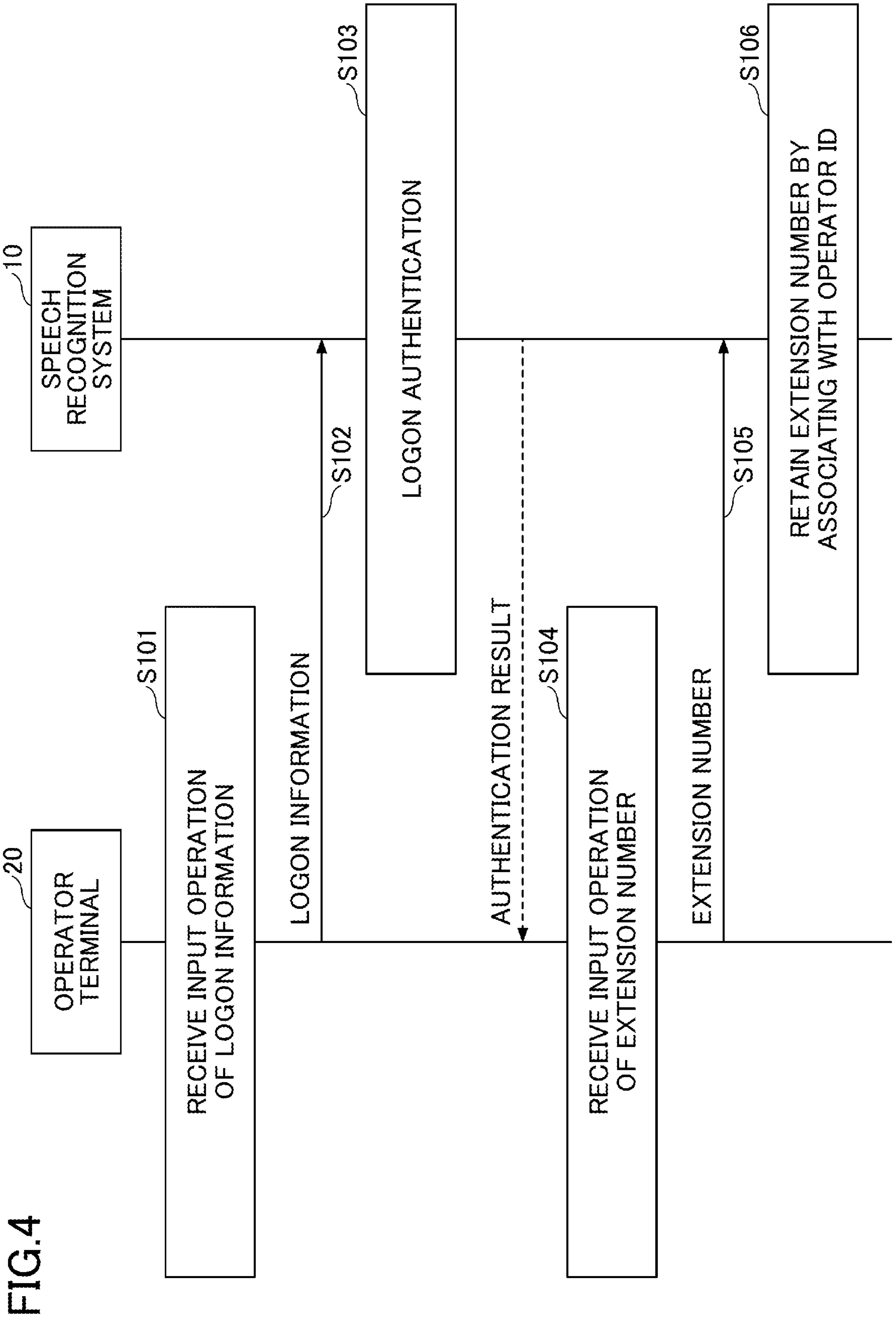
FIG. 4 is a sequence diagram illustrating an example of processing at logon according to the first embodiment.

In the following, processing when an operator logs on to the operator terminal 20 will be described with reference to FIG. 4.

The UI controller 203 of the operator terminal 20 receives an operation to input logon information by an operator (step S101). Here, the operator can input logon information in a logon window G1000 as illustrated in FIG. 5, for example.

Figure 5:
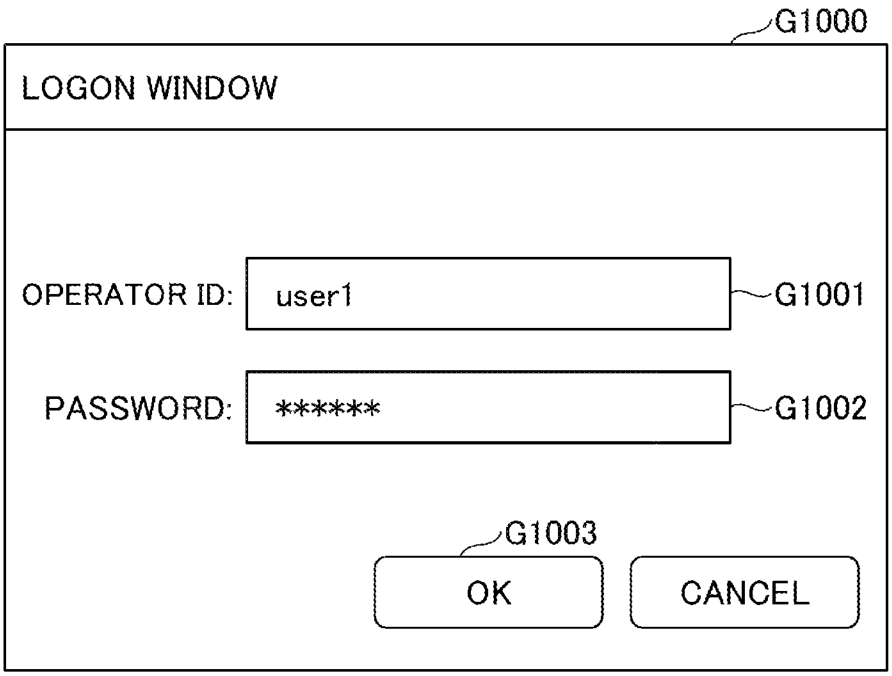
FIG. 5 is a diagram illustrating an example of a logon window.

That is, the operator can input the logon information in the logon window G1000 as illustrated in FIG. 5 by inputting his or her own operator ID into an operator ID input field G1001, inputting a password corresponding to the operator ID into a password input field G1002, and then pressing an OK button G1003.

The logon requester 201 of the operator terminal 20 transmits the logon information (the operator ID and the corresponding password) input by the input operation in step S101 to the speech recognition system 10 (step S102).

Upon receiving of the logon information from the operator terminal 20, the authenticator 101 of the speech recognition system 10 authenticates the operator terminal 20 by using the logon information (step S103). That is, the authenticator 101 verifies whether or not the operator ID and the password included in the logon information are correct, and when the verification is successful, it is determined that the authentication is successful, and when the verification is not successful, it is determined that the authentication is unsuccessful. Although the verification of whether or not the operator ID and password are correct can be performed in various methods, generally a method of verifying whether or not the operator ID and the password included in the logon information are correct by referring to an authentication information table, in which the correct operator ID and password are stored, is used.

The authenticator 101 returns an authentication result (authentication success or authentication failure) to the operator terminal 20. In the following description, it is assumed that the authentication result indicating a successful authentication is returned.

Figure 6:
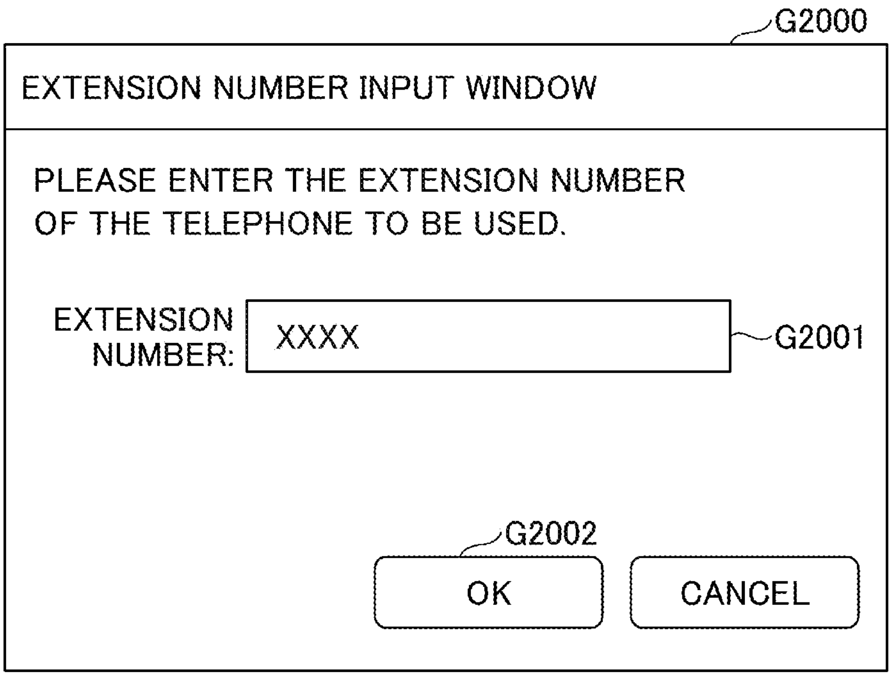
FIG. 6 is a diagram illustrating an example of an extension number input window.

The UI controller 203 of the operator terminal 20 receives an operation to input the extension number by the operator (step S104). Here, the operator can input the extension number in an extension number input window G2000 as illustrated in FIG. 6, for example. In other words, the operator can input an extension number in the extension number input window G2000 as illustrated in FIG. 6, by inputting the extension number of the telephone 30 installed at the operator's seat into an extension number input field G2001 and then pressing an OK button G2002.

The extension number transmitter 202 of the operator terminal 20 transmits the extension number input by the input operation in step S104 to the speech recognition system 10 (step S105).

When the extension number retainer 102 of the speech recognition system 10 receives the extension number from the operator terminal 20, the extension number is associated with the operator ID included in the logon information received in the above step S103 and stored in the storage 110 (step S106). As a result, information (hereinafter, also referred to as association information), in which the extension number and the operator ID are associated together in a format of (extension number, operator ID), is held in the storage 110. For example, when the association information including the same extension number as the extension number received from the operator terminal 20 is already stored in the storage 110, the extension number retainer 102 may update the operator ID included in the association information to the operator ID included in the logon information received in the above step S103.

In the extension number input window G2000 as illustrated in FIG. 6, the operator can freely input the extension number into the extension number input field G2001. Therefore, there is a possibility that an error in an input of the extension number may occur. Also, by inputting the extension number of another seat, a call of another operator can be referenced in an operator window described later. Therefore, it is preferable that the operator can select one of a plurality of predetermined extension numbers instead of freely inputting an extension number.

Figure 7:
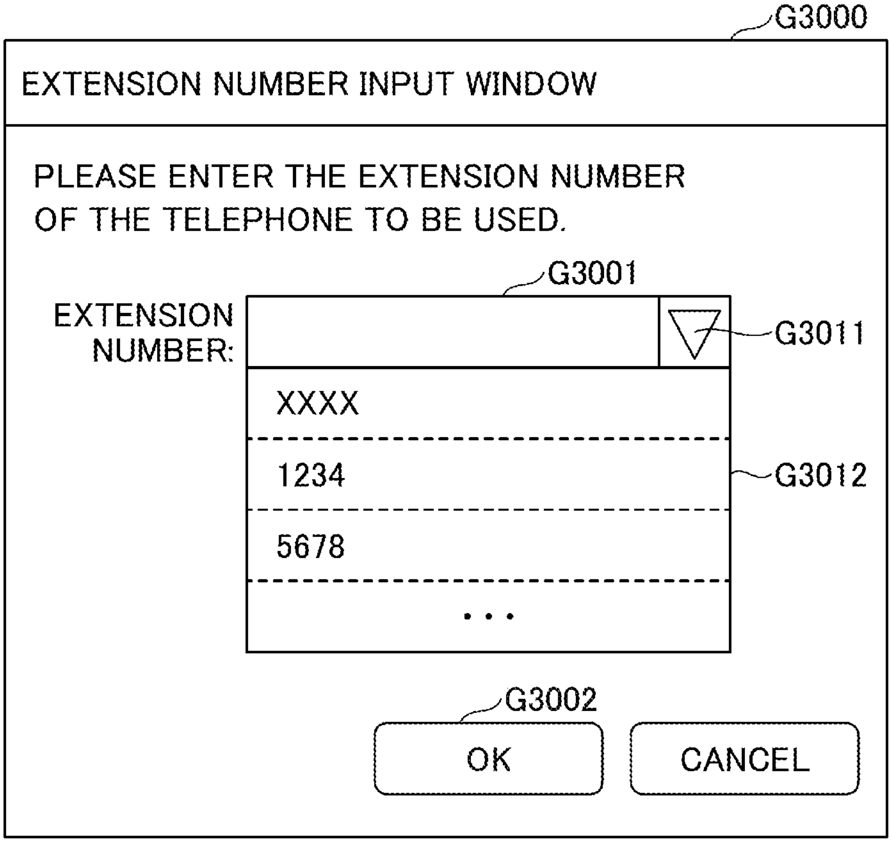
FIG. 7 is a diagram illustrating another example of the extension number input window.

In this case, instead of the extension number input window G2000 as illustrated in FIG. 6, an extension number input window G3000 as illustrated in FIG. 7, for example, may be displayed. A pull-down menu button G3011 is provided in an extension number input field G3001 of the extension number input window G3000 as illustrated in FIG. 7, and when the operator presses the pull-down menu button G3011, extension numbers selectable by the operator are displayed as a pull-down menu G3012. Therefore, the operator selects the extension number of the telephone 30 installed at the operator's seat from the pull-down menu G3012, and then presses an OK button G3002 to input the extension number. As a result, a situation in which an incorrect extension number is input, or a situation in which an extension number of another seat is fraudulently input, can be prevented.

In general, in a contact center, several seats are installed together (in other words, seats are set up in a so-called island layout) in accordance with the contents of the telephone answering service (for example, contract work, support work, sales work, etc.). For this reason, for example, in the case of the free address system in which the operator selects his or her own seat from a specific seat group in accordance with the content of the telephone answering service, extension numbers selectable by the operator may be determined for each seat group. Alternatively, for example, extension numbers selectable by the operator may be determined for each seat or area in which the seat group exists. In addition to these, for example, in the case where the operators are grouped in accordance with the content of the telephone answering service, the group to which the operator belongs may be identified from the operator ID used for logon, and the extension numbers selectable according to the group may be determined.

Further, although the logon information is input in the logon window and the extension number is input in the extension number input window in the above, the present disclosure is not limited thereto. For example, both the logon information and the extension number may be input in the same window.

<Speech Recognition Processing>

Hereinafter, it is assumed that the operator logs on to the operator terminal 20 and communicates via the telephone with the customer terminal 80 by using the telephone 30 installed at the same seat as the operator terminal 20. At this time, processing in which speech recognition of the call is performed and a result is displayed on the display of the operator terminal 20, will be described with reference to FIG. 8. During a call between the telephone 30 and the customer terminal 80, a packet (speech packet) of the call is captured by the NW switch 70, and each time or after a packet of a predetermined data amount is buffered, the packet is transmitted to the speech recognition system 10.

When the packet captured by the NW switch 70 is received (step S201), the extension number identifier 103 of the speech recognition system 10 identifies the extension number of the telephone 30 performing the call from the packet (step S202). Accordingly, the operator ID can be identified from the identified extension number and the association information stored in the storage 110, and thus the call is associated with the operator.

Since an extension number is generally included in a packet, the extension number identifier 103 can identify the extension number by analyzing the packet. However, the analysis is difficult when, for example, the packet is encrypted or when a protocol of the packet is not a general protocol. Therefore, in such a case, under an assumption that an IP address of the telephone 30 is fixed, the extension number identifier 103 can specify the extension number from the IP address of the packet by referring to an extension number table in which the IP address of the telephone 30 and its extension number are stored.

Next, the speech recognizer 104 of the speech recognition system 10 performs speech recognition on the speech data included in the packet and converts the speech represented by the speech data into a speech recognized text (step S203).

Next, the speech recognizer 104 of the speech recognition system 10 refers to the association information stored in the storage 110 and identifies the operator ID corresponding to the extension number identified in step S202 (step S204).

Next, the speech recognizer 104 of the speech recognition system 10 transmits the speech recognized text (speech recognition result) obtained in step S203 to the operator terminal 20 logged on with the operator ID identified in step S204 (step S205).

Figure 9:
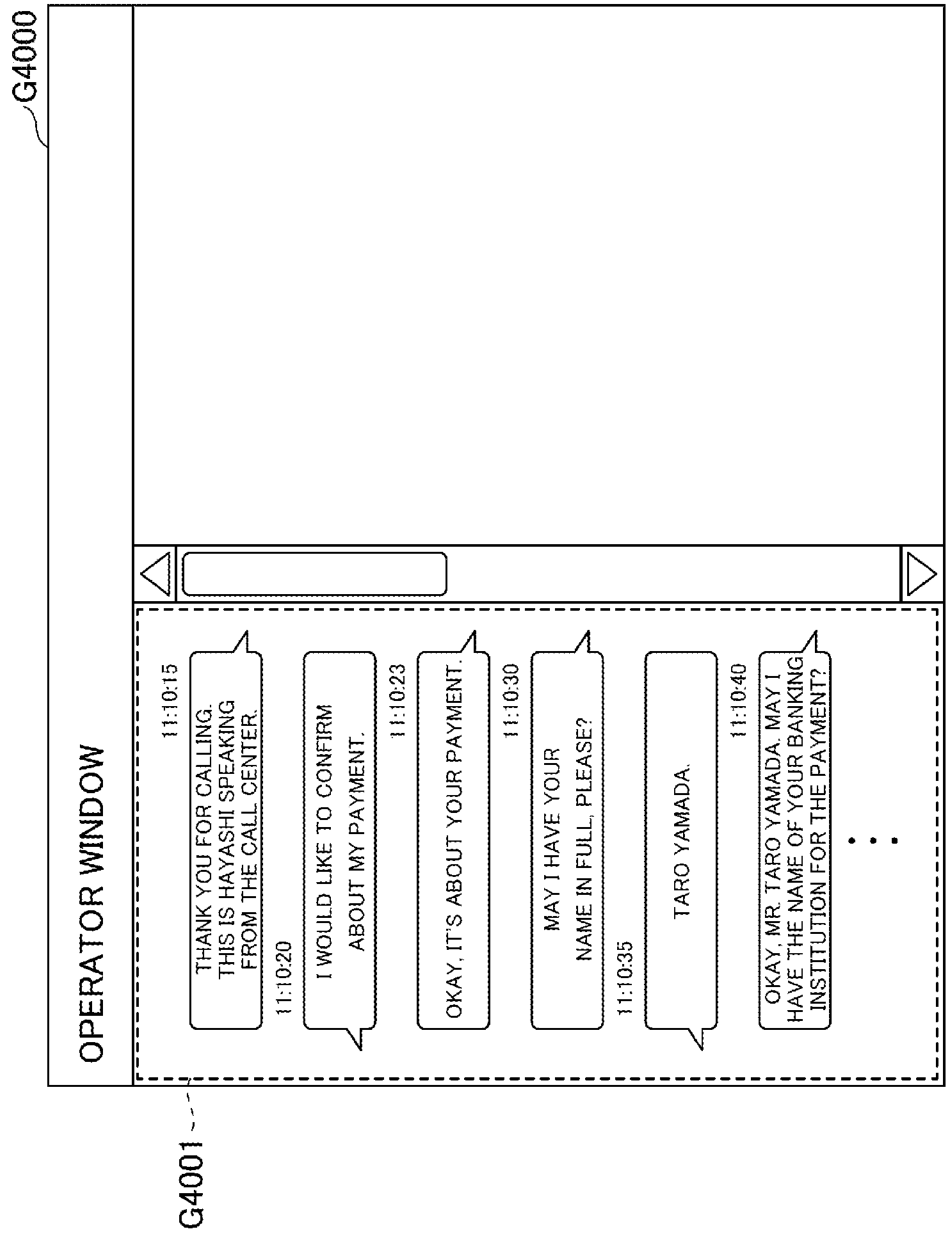
FIG. 9 is a diagram illustrating an example of an operator window.

When receiving the speech recognized text representing the speech recognition result, the UI controller 203 of the operator terminal 20 displays the speech recognized text on a display (step S206). For example, it is assumed that an operator window G4000 as illustrated in FIG. 9 is displayed on the display of the operator terminal 20. The operator window G4000 includes an utterance display area G4001 displaying the speech recognized text representing utterances of the operator and the customer. When the speech recognized text is received, the UI controller 203 displays the speech recognized text in the utterance display area G4001 in a chronological order based on each speaker. This makes it possible for the operator to check the content of each utterance by each speaker during a call in real time in a text format.

Second Embodiment

Next, the second embodiment will be described. As described above, in the extension number input window G2000 as illustrated in FIG. 6, an input error of an extension number or a fraudulent input of an extension number may occur. On the other hand, in the extension number input window G3000 as illustrated in FIG. 7, an input error of an extension number or a fraudulent input of an extension number can be prevented. For example, in a case where an extension number that an operator can select is determined for each seat group, it is possible to input an extension number of the same seat group as the seat selected by the operator himself/herself. Therefore, for example, by inputting an extension number of another seat in the same seat group as the seat selected by the operator himself/herself, it is possible to fraudulently view a call of the operator sitting in another seat.

Therefore, in the present embodiment, for the purpose of suppressing the above-mentioned frauds, a case in which an alert is notified to a supervisor or the like when a fraud is detected will be described. In addition, a case in which an extension number or the like input by an operator is saved as a log, together with a speech recognized text or the like for a later audit or the like, will be described. Furthermore, a case in which such a log is associated with information representing an operator (hereinafter, also referred to as operator information) will also be described, since it is unclear which log belongs to which operator when the operator ID is not included in the log due to a data format of the log. Moreover, even when an operator ID can be included in the log, a log in which an operator ID is not included or a log in which a wrong operator ID is included will be generated when an extension number or the like is not input or when a wrong operator ID is input. Accordingly, a case of complementing/correcting such a log will also be described.

In the present embodiment, differences from the first embodiment will be described, and explanation of the same configuration as that of the first embodiment will be omitted.

<Functional Configuration of Contact Center System 1>

Figure 10:
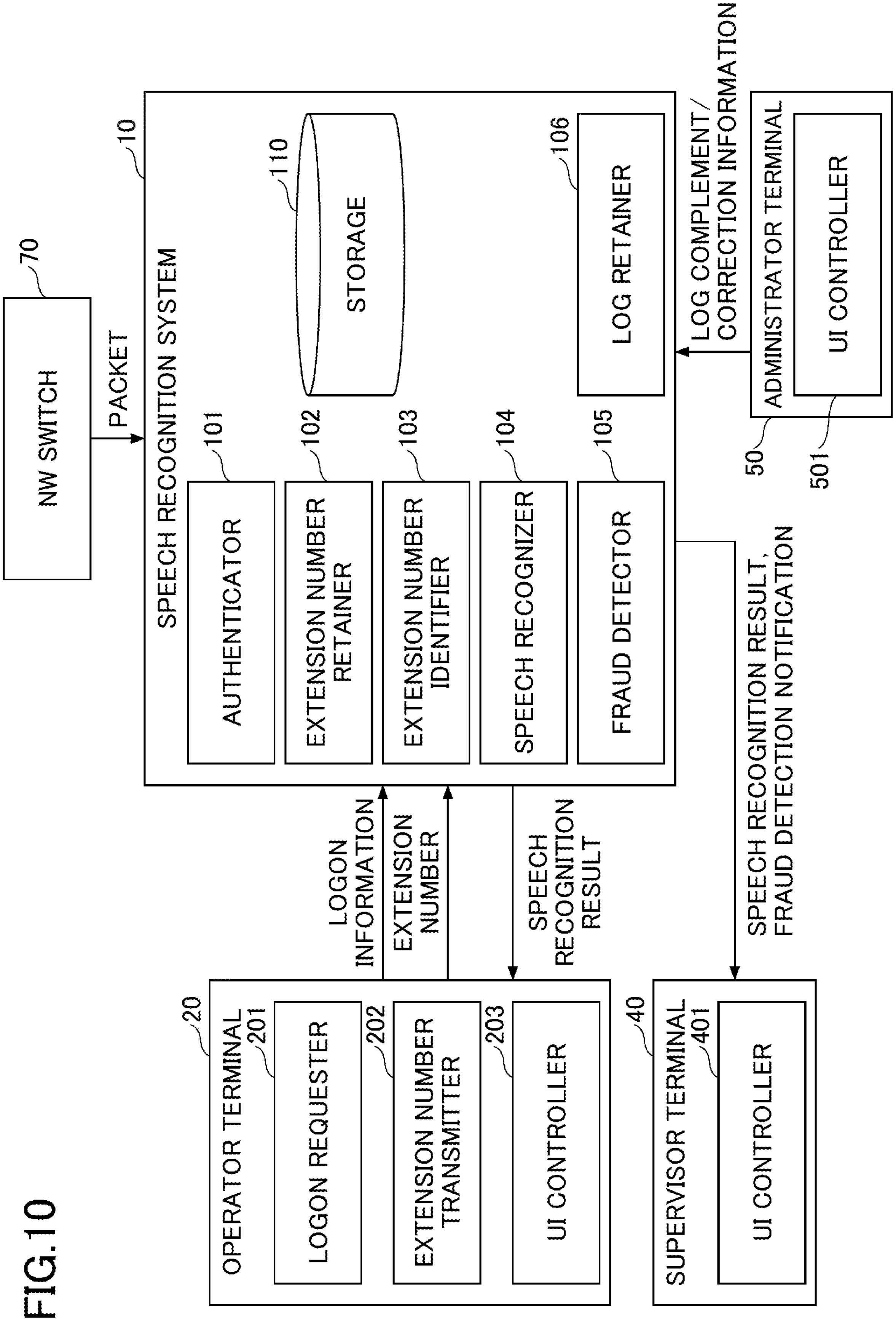
FIG. 10 is a diagram illustrating an example of a functional configuration of a contact center according to a second embodiment.

FIG. 10 is a diagram illustrating a functional configuration of the speech recognition system 10, the operator terminal 20, the supervisor terminal 40, and the administrator terminal 50, that are included in the contact center system 1, according to the present embodiment.

<<Speech Recognition System 10>>

As illustrated in FIG. 10, the speech recognition system 10 according to the present embodiment is different from the first embodiment in that it further includes a fraud detector 105 and a log retainer 106. The fraud detector 105 and the log retainer 106 are implemented, for example, by processing in which one or more programs installed in the speech recognition system 10 are executed by a processor such as the CPU.

The fraud detector 105 detects a fraud when an extension number transmitted from the operator terminal 20 that has succeeded in authentication is fraudulent. The fraud detector 105 also transmits to the supervisor terminal 40 a notice (hereinafter, also referred to as a fraud detection notice) indicating that a fraudulent extension number may have been input, when a fraud is detected.

The log retainer 106 generates a log including such as an extension number identified by the extension number identifier 103 and a speech recognized text converted by the speech recognizer 104, and stores the log in the storage 110 as a log of the call. Here, the log includes, for example, time, an extension number, a speech recognized text, and the like. However, these are only examples and thus what is included in the log is not limited thereto. For example, information such as a call ID, an operator ID, a name of an operator identified by the operator ID, call start time, a telephone number of the customer terminal 80, and the like may be included in the log. Further, for example, information such as an operator's work-starting time and leaving time, logon time when the operator logged on to the operator terminal 20, logout time when the operator logged out, and the like may be included. Furthermore, for example, when a storage period of the log is different depending on the log, information such as the storage period may be included in the log. The log may be identified by a log ID, or by the call ID since a log is generated for each call.

In addition to the functions described in the first embodiment, the speech recognizer 104 transmits the operator ID and the speech recognized text to the supervisor terminal 40 that monitors the operator having the identified operator ID.

<<Supervisor Terminal 40>>

As illustrated in FIG. 10, the supervisor terminal 40 according to the present embodiment includes a UI controller 401. The UI controller 401 is implemented, for example, by causing a processor such as the CPU to execute one or more programs installed in the supervisor terminal 40.

The UI controller 401 displays an alert indicating that there is a possibility that a fraudulent extension number has been input, when a fraud detection notice from the speech recognition system 10 is received. The UI controller 401 displays the speech recognized text or the like received from the speech recognition system 10 in a predetermined window (for example, a monitoring window for monitoring a call of an operator).

<<Administrator Terminal 50>>

As illustrated in FIG. 10, the administrator terminal 50 according to the present embodiment has a UI controller 501. The UI controller 501 is implemented, for example, by causing a processor such as the CPU to execute one or more programs installed in the administrator terminal 50.

The UI controller 501 displays a predetermined window (hereinafter, also referred to as an operator information/log association window) for associating operator information with a log, or displays a predetermined window (hereinafter, also referred to as a log complement/correction window) for complementing or correcting a log.

The UI controller 501 receives an operation to input operator information/log association information representing the association between the operator information and the log in the operator information/log association window, and transmits the operator information/log association information including the information input by the operation, to the speech recognition system 10. Here, the operator information is information that includes at least an operator ID. In addition to the operator ID, the operator information may include, for example, information such as the name of the operator and an attendance time range of the operator. On the other hand, the operator information/log association information is the information for associating the operator information with the log, and the information includes, for example, at least an operator ID and an extension number. In the input operation of the operator information/log association information, an operator ID and an extension number can be input, but other various types of information may be input.

Further, the UI controller 501 receives the operation to input the log complement/correction information in the log complement/correction window, and transmits the log complement/correction information including the information input by the operation to the speech recognition system 10. In the input operation of the log complement/correction information, an operator ID and the like can be input, but other various types of information, such as the work-starting time, the leaving time, the logon time, the logout time, and the like of the operator identified by the operator ID may be input.

<Speech Recognition Processing>

Figure 11:
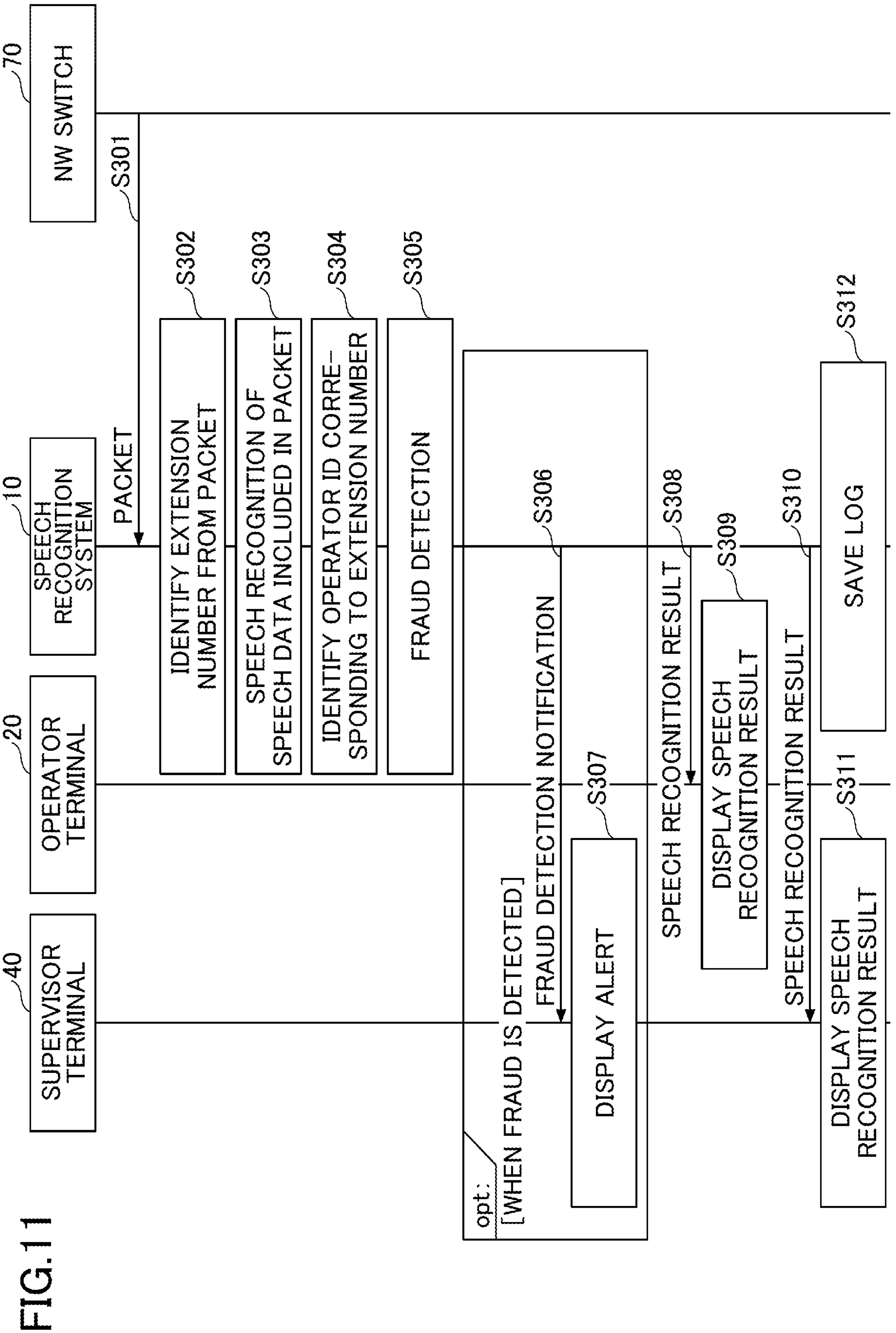
FIG. 11 is a sequence diagram illustrating an example of speech recognition processing according to the second embodiment.

Hereinafter, it is assumed that the operator logs on to the operator terminal 20 and communicates via the telephone with the customer terminal 80 by using the telephone 30 installed at the same seat as the operator terminal 20. Referring to FIG. 11, a description will be given of processing for performing speech recognition of the call and displaying a result on the display of the operator terminal 20. While the telephone 30 and the customer terminal 80 are communicating with each other via the telephone, packets (speech packets) of the call are captured by the NW switch 70, and after each capture or after a packet of a predetermined data amount is buffered, the packets are transmitted to the speech recognition system 10.

Figure 8:
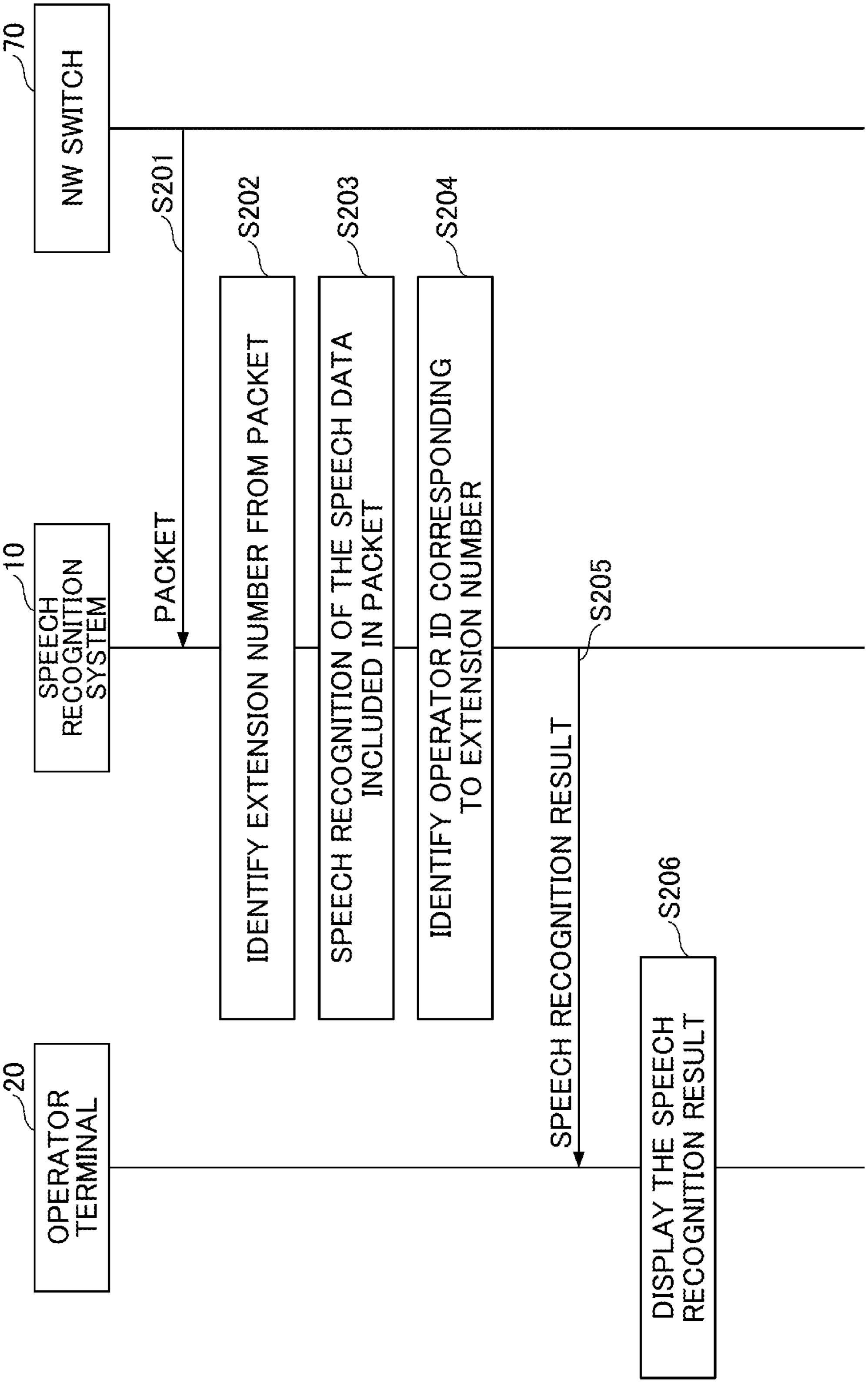
FIG. 8 is a sequence diagram illustrating an example of speech recognition processing according to the first embodiment.

Steps S301 to S304 in FIG. 11 are the same as steps S201 to S204 in FIG. 8, and the description thereof will be omitted.

Following step S304, the fraud detector 105 of the speech recognition system 10 detects a fraud when the extension number transmitted from the operator terminal 20 that has succeeded in authentication is fraudulent (step S305). That is, the fraud detector 105 uses the operator ID identified in step S304 to determine whether or not the extension number associated with the operator ID is fraudulent, and when the extension number is determined to be fraudulent, the fraud detector 105 determines that a fraud is detected.

Here, the fraud detector 105 may detect whether or not the extension number is fraudulent by the following method 1 or 2, for example.

Method 1: Generally, an operator of a contact center often performs a telephone answering service according to a manual called a talk script. Also, in the talk script, an utterance content of the operator is defined for each scene of telephone answering, and in an "opening" scene at the start of the telephone answering, a self-introduction speech such as "Thank you for calling. This is xxx (operator's family name) from the XXX call center." is generally defined. Therefore, in method 1, the speech recognized text representing the "self-introduction speech" in the "opening" scene of the call is compared (matched) with the family name of the operator identified by the operator ID. When the family name of the operator is included in the speech recognized text, it is determined that the extension number associated with the operator ID is authorized, and when not included, it is determined that the extension number associated with the operator ID is fraudulent. The above comparison (matching) can be achieved, for example, by pattern matching of character strings.

Method 2: By using a known technique called voiceprint authentication, voice of a call is compared with voice of an operator identified by an operator ID. When a degree of matching is equal to or greater than a predetermined threshold value, it is determined that the extension number associated with the operator ID is authorized, and when the degree of matching is less than the predetermined threshold value, it is determined that the extension number associated with the operator ID is fraudulent. It is necessary to register in advance speech data representing the voice of the operator identified by the operator ID, data representing a feature of the voice of the operator, and the like. By using the voiceprint authentication, an input of a fraudulent extension number or an incorrect extension number can be detected even when the operator works in a remote place (such as an operator's home, a remote location, a shared office, etc.).

When a fraud is detected in step S305, the fraud detector 105 of the speech recognition system 10 transmits a fraud detection notice to the supervisor terminal 40 which monitors the operator of the operator ID (step S306). The fraud detection notice includes, for example, the operator ID and the extension number associated with the operator ID according to the association information.

When the UI controller 401 of the supervisor terminal 40 receives the fraud detection notice, the UI controller 401 displays an alert indicating that a fraudulent extension number may have been input on the display (step S307). At this time, the UI controller 401 displays the operator ID and the extension number included in the fraud detection notice together with the alert. Furthermore, the name of the operator identified by the operator ID may be displayed together with the operator ID. Further, information related to the call represented by the extension number (for example, call start time, call end time, a log, etc.) may be displayed, or information other than the call (for example, work-starting time, leaving time, logon time, logout time, etc.) may be displayed. The alert may be displayed in a display mode such as a pop-up window, for example, or in any other display modes. Furthermore, the alert may be displayed with sound or the like, or may be output as speech by using a technique such as speech synthesis.

Thus, when a fraudulent extension number is input, the supervisor can easily recognize the fraud.

Since steps S308 and S309 in FIG. 11 are the same as steps S205 and S206 in FIG. 8, their description will be omitted.

Subsequently, the speech recognizer 104 of the speech recognition system 10 transmits, to the supervisor terminal 40 monitoring the operator with the operator ID identified in step S304 (step S310), the speech recognized text (speech recognition result) obtained in step S303 and the operator ID.

Upon receiving of the operator ID and the speech recognized text, the UI controller 401 of the supervisor terminal 40 displays the name of the operator identified by the operator ID and the speech recognized text, in the monitoring window (step S311). Thus, the supervisor can confirm, concerning the call, the name of the operator and the content of the call in real time, and can confirm whether or not the operator is really communicating on the telephone. Therefore, it is expected that the operator can be prevented from inputting a fraudulent extension number, and even when no alert is displayed, it is expected that an input of a fraudulent extension number can be detected.

Meanwhile, the log retainer 106 of the speech recognition system 10 generates a log at least including the extension number identified in step S302 and the speech recognized text (that is, the speech recognized text created in step S303) of the call, and stores the log in the storage 110 (step S312). When the operator ID is identified in step S304 and when the data format is such that the operator ID can be included in the log, the log retainer 106 generates a log including the operator ID. This makes it possible to use the log for an audit at a later date, for example, to confirm that no fraudulent extension number is input.

<Processing of Operator Information/Log Association>

Figure 12:
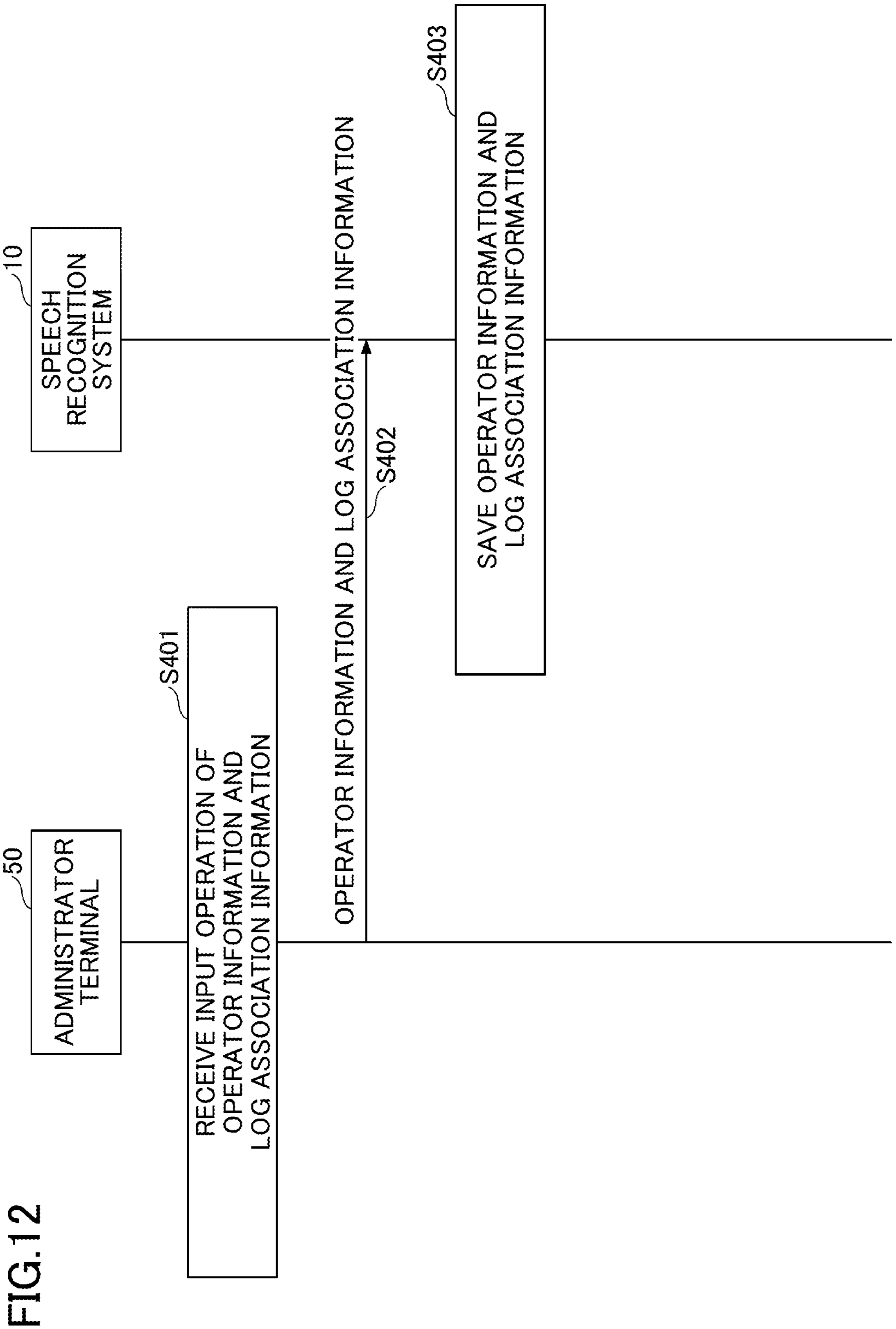
FIG. 12 is a sequence diagram illustrating an example of operator information/log association processing according to the second embodiment.

Hereinafter, it is assumed that the operator ID is not included in a log (that is, the log data format does not allow an operator ID to be included in the log). In this case, it is unclear which log belongs to which operator. Therefore, processing for associating the operator information with the log will be described below with reference to FIG. 12.

The UI controller 501 of the administrator terminal 50 receives an operation to input the operator information/log association information by the administrator (step S401). Here, for example, the administrator can input the operator information/log association information by specifying the operator ID included in the operator information and the extension number included in the log, in the operator information/log association window. At this time, the administrator may specify an operator ID and an extension number that are considered to be appropriate by referring to the attendance time range included in the operator information, the work-starting time and the leaving time included in the log, and the like. Thus, for example, it is possible to match the attendance time range of the operator with the actual work-starting time and the leaving time to prevent the same operator from being doubly associated with a log of a different extension number in the same time range, or to prevent the log from being associated with an operator despite the operator not being present during the time, thereby achieving more accurate association. Moreover, even when the operator inputs an incorrect extension number, by matching the attendance time range of the operator with the actual work-starting time and the leaving time, the operator information can be correctly associated with the log.

The UI controller 501 of the administrator terminal 50 transmits the operator information/log association information input by the input operation in step S501 to the speech recognition system 10 (step S402).

When the log retainer 106 of the speech recognition system 10 receives the operator information/log association information, the log retainer 106 stores the operator information/log association information in the storage 110 (step S403). In this way, the operator information/log association information for associating the operator information with the log is stored in the storage 110, and thus association of which log belongs to which operator is achieved.

Here, an example of the input operation of the operator information/log association information by the administrator has been described, but the example is not limited thereto. For example, when the operator logs on (successfully authenticated) from the operator terminal 20, the operator ID and the extension number are associated with each other, and times of logon and log-off are recorded. As another case, suppose that at least the extension number, the call start time, and the call end time (or individual utterance time) are recorded in the log. In this case, by matching the call start time and the call end time (or individual utterance time) with a time period between logon to log-off, the log and the operator information can be automatically associated with each other. Thus, from a result of the matching, operator information and log association information can be generated and stored. In this way, the operator information and the log association information can be generated without recording the operator information in the log. Furthermore, when the operator terminal information such as identification information, an IP address, and the like of the operator terminal 20 are available, the association may be performed by using such information.

<Processing of Log Complement/Correction>

Hereinafter, it is assumed that an operator ID can be included in a log (that is, the log data format allows an operator ID to be included in a log).

Figure 13:
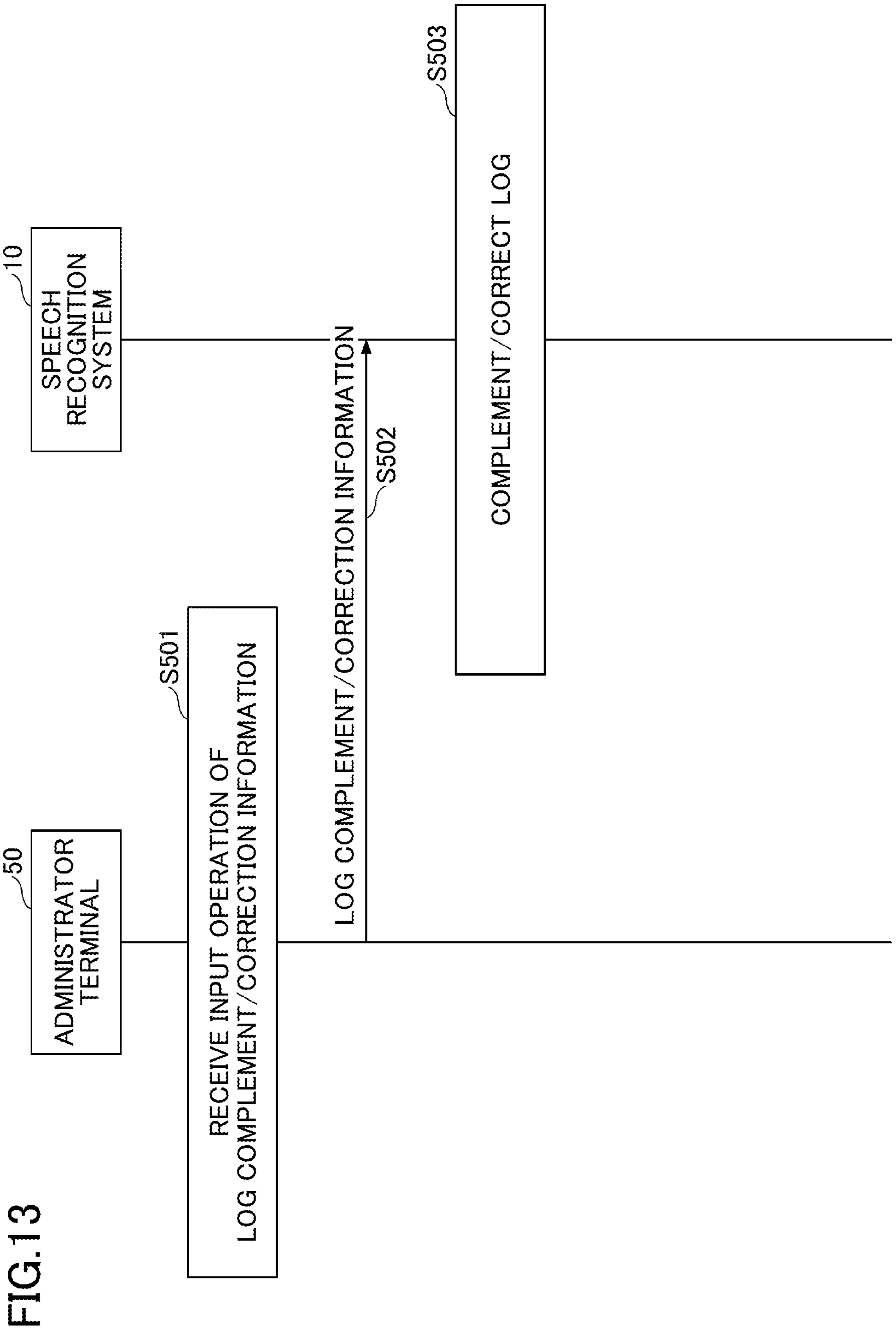
FIG. 13 is a sequence diagram illustrating an example of log complement/correction processing according to the second embodiment.

For example, when the operator does not log on to the operator terminal 20 (that is, when no extension is entered), the log generated in step S312 of FIG. 11 does not contain an operator ID. For example, when an incorrect extension number is input, the log generated in step S312 of FIG. 11 contains the incorrect operator ID. With reference to FIG. 13, the following describes processing for complementing the operator ID in the log or correcting the operator ID included in the log.

The UI controller 501 of the administrator terminal 50 receives an operation to input the log complement/correction information by the administrator (step S501). Here, the administrator can perform the input operation of the log complement/correction information by, for example, specifying the log to be complemented/corrected by a log ID (or, may be a call ID) in the log complement/correction window and inputting information to be complemented/corrected (for example, operator ID, etc.) to the log. Note that the information to be complemented/corrected is not limited to the operator ID as described above, but may be, for example, work-starting time, leaving time, logon time, logout time, log storage period, and the like of the operator.

The UI controller 501 of the administrator terminal 50 transmits the log complement/correction information input by the input operation in step S501 to the speech recognition system 10 (step S502).

When the log retainer 106 of the speech recognition system 10 receives the log complement/correction information, the log retainer 106 complements/corrects the log stored in the storage 110 based on the log complement/correction information (step S503).

For example, when a log ID "001" and an operator ID "user1" are included in the log complement/correction information and when a log with the log ID "001" stored in the storage 110 does not contain an operator ID, the log retainer 106 sets the operator ID of the log to "user1". In this way, the operator ID "user1" is complemented to the log when the log does not contain an operator ID.

For example, when a log ID "002" and an operator ID "user2" are included in the log complement/correction information and the log with the log ID "002" stored in the storage 110 contains an operator ID "user3", the log retainer 106 corrects the operator ID of the log from "user3" to "user2". In this way, the operator ID is corrected to "user2" when the log contains the incorrect operator ID "user3". However, the information before the correction (such as the operator ID before correction, etc.) may be saved in the log for an audit or the like at a later date.

In addition to the above, for example, when a log ID "001", work-starting time "9:00", and leaving time "17:00" are included in the log complement/correction information, the log retainer 106 may set, in the log of the log ID "001" stored in the storage 110, "9:00" for the work-starting time and "17:00" for the leaving time. In this way, even after log generation, the work-starting time and the leaving time (logon time, logout time, or the like may also be used) of the operator identified by the operator ID included in the log can be set. In this way, the log can be useful in an audit or the like.

SUMMARY

As described above, the contact center system 1 according to the first and second embodiments can associate a call with an operator responding to the call by using information (the operator ID, the extension number of the telephone 30) input by the operator terminal 20 installed at the same seat as the telephone 30. In this way, the contact center system 1 according to the first and second embodiments can display a speech recognized text on the operator terminal 20 without performing the CTI linkage. In addition to this, by associating the call with the operator responding to the call, various functions (such as, evaluation of call quality on an operator basis) that are provided by the CTI linkage can be implemented.

Therefore, even when there are various circumstances in which CTI cannot be introduced (for example, when an existing PBX does not support the CTI linkage function or when, although CTI linkage is difficult due to a lack of capacity, the replacement cost of the PBX is not acceptable), various functions such as support of operator responding and evaluation of the call quality can be implemented.

In the contact center system 1 according to the second embodiment, an input error or a fraudulent input of an extension number that may occur in the first embodiment can be detected. Also, a log for auditing the error or the fraudulent input can be stored. Accordingly, as compared with the contact center system 1 according to the first embodiment, operation with enhanced security can be achieved.

The present invention is not limited to the embodiments described above, and can be modified or changed in various ways and can be combined with known techniques within the scope of the gist of the present invention recited in the claims.

REFERENCE SIGNS LIST

1 Contact center system
10 Speech recognition system
20 Operator terminal
30 Telephone
40 Supervisor terminal
50 Administrator terminal
60 PBX
70 NW switch
80 Customer terminal
90 Communication network
101 Authenticator
102 Extension number retainer
103 Extension number identifier
104 Speech recognizer
105 Fraud detector
106 Log retainer
110 Storage
201 Logon requester
202 Extension number transmitter
203 UI controller
401 UI controller
501 UI controller
E Contact center environment

The invention claimed is:

1. An information processing device, comprising:
a memory; and
a processor connected to the memory and configured to:
store in a storage, association information in which a user identifier (ID) is associated with a first number, wherein the user ID is used in authentication of a user using a first terminal connected via a communication network, and the first number has been received by the information processing device from the first terminal;
identify a second number from a speech packet of a voice communication, wherein the speech packet indicates the second number, and the speech packet comprises voice data of at least a part of utterance during the voice communication; and
identify the user ID in the voice communication when the first number matches the identified second number according to the association information stored in the storage.

2. The information processing device according to claim 1, wherein
the processor is configured to
convert speech represented by speech data included in the speech packet into a text by speech recognition; and
transmit the text to the first terminal logged on with the identified user ID.

3. The information processing device according to claim 2, wherein
the processor is further configured to transmit the user ID and the text, to a second terminal of a supervisor who monitors the voice communication of the user identified by the user ID.

4. The information processing device according to claim 2, wherein the processor is further configured to generate log information comprising at least the second number and the text, and store the log information in the storage.

5. The information processing device according to claim 4, wherein the processor is further configured to store in the storage, information that associates user information including the user ID with the log information including the second number, in accordance with specification of the user ID and the second number in a predetermined window, the predetermined window being displayed on a third terminal connected via a communication network.

6. The information processing device according to claim 1, wherein the processor is configured to determine whether or not the first number included in the association information is fraudulent by using the second number, and transmit to the second terminal of the supervisor monitoring the user identified by the user ID, notification information that requests the supervisor to perform a check on association between the user ID and the first number that are in the association information, upon determination that the first number is fraudulent.

7. The information processing device according to claim 6, wherein the processor is configured to generate the notification information that requests the supervisor to perform a check on the association, by using at least one type of information selected from among information related to a voice communication represented by the first number and information related to other than the voice communication.

8. The information processing device according to claim 6, wherein the processor is configured to determine that the first number is not fraudulent for a case in which a family name of a user identified by the user ID is included in a text representing a speech recognition result of an opening scene, the opening scene being a scene representing a start of the voice communication, and determine that the first number is fraudulent in a case the family name of the user identified by the user ID is not included in the text.

9. The information processing device according to claim 6, wherein the processor is configured to perform a comparison between voice of the voice communication and voice of the user identified by the user ID by voiceprint authentication, determine that the first number is not fraudulent for a case in which a degree of matching representing a result of the comparison is equal to or greater than a predetermined threshold value, and determine that the first number is fraudulent in a case the degree of matching is less than the predetermined threshold value.

10. The information processing device according to claim 1, wherein the first number is a number selected from a plurality of numbers predetermined in accordance with an area where the first terminal is installed or the user ID.

11. The information processing device according to claim 1, wherein the processor is configured to store in the storage, the association information in which the user ID input in an authentication window displayed on the first terminal is associated with the first number input in the authentication window displayed on the first terminal or in a window displayed after succeeding in an authentication in the authentication window.

12. An information processing method, comprising:

storing in a storage, association information in which a user identifier (ID) is associated with a first number, wherein the user ID is used in authentication of a user using a first terminal connected via a communication network, and the first number has been received by an information processing device from the first terminal;

identifying a second number from a speech packet of a voice communication, wherein the speech packet indicates the second number, and the speech packet comprises voice data of at least a part of utterance during the voice communication; and identifying the user ID in the voice communication when the first number matches the identified second number according to the association information stored in the storage, wherein the storing, the identification of the second number, and the identification of the user ID being executed by a computer.

13. A non-transitory computer-readable recording medium storing a program for causing a computer to execute:

storing in a storage, association information in which a user identifier (ID) is associated with a first number, wherein the user ID is used in authentication of a user using a first terminal connected via a communication network, and the first number has been received by an information processing device from the first terminal;

identifying a second number from a speech packet of a voice communication, wherein the speech packet indicates the second number, and the speech packet comprises voice data of at least a part of utterance during the voice communication; and identifying the user ID in the voice communication when the first number matches the identified second number according to the association information stored in the storage.

* * * * *